(12) United States Patent
Annampedu et al.

(10) Patent No.: US 7,167,328 B2
(45) Date of Patent: Jan. 23, 2007

(54) SYNCHRONIZING AN ASYNCHRONOUSLY DETECTED SERVO SIGNAL TO SYNCHRONOUS SERVO DEMODULATION

(75) Inventors: Viswanath Annampedu, Schnecksville, PA (US); Pervez M. Aziz, Dallas, TX (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 11/223,090

(22) Filed: Sep. 9, 2005

(65) Prior Publication Data

US 2006/0132955 A1  Jun. 22, 2006

Related U.S. Application Data

(60) Provisional application No. 60/636,927, filed on Dec. 17, 2004.

(51) Int. Cl.
*G11B 5/09* (2006.01)
*G11B 21/10* (2006.01)
*G11B 5/02* (2006.01)

(52) U.S. Cl. ............ 360/53; 360/46; 360/51; 369/47.18; 369/59.21

(58) Field of Classification Search ............ 369/47.18
See application file for complete search history.

(56) References Cited

U.S. PATENT DOCUMENTS

| | | | |
|---|---|---|---|
| 5,835,295 A | 11/1998 | Behrens | 360/51 |
| 6,530,060 B1 | 3/2003 | Vis et al. | 714/792 |
| 6,657,802 B1 | 12/2003 | Ashley et al. | 360/51 |
| 6,810,485 B1 * | 10/2004 | McEwen et al. | 713/503 |
| 6,816,328 B1 * | 11/2004 | Rae | 360/51 |
| 2003/0215036 A1 * | 11/2003 | Ma | 375/355 |
| 2004/0136477 A1 | 7/2004 | Annampedu et al. | 375/340 |

FOREIGN PATENT DOCUMENTS

EP   1 274 071 A2   1/2003

* cited by examiner

*Primary Examiner*—Wayne Young
*Assistant Examiner*—Jason Olson

(57) ABSTRACT

A first set of data is detected in a signal having synchronous samples and interpolated samples, wherein the first set of data is detected asynchronously as corresponding to one of the samples. A time to transmit a data-found signal is determined based on an offset between the data-detected sample and one of the synchronous samples, and the data-found signal is transmitted at the determined time to enable the synchronous processing of the synchronous samples. In one implementation, the synchronous samples correspond to a readback signal read from a data recording channel, the first set of data corresponds to servo address mark (SAM) data in a servo sector in the readback signal, and the synchronous processing is demodulation of burst data in the servo sector.

20 Claims, 3 Drawing Sheets

SYNCHRONIZING AN ASYNCHRONOUSLY DETECTED SERVO SIGNAL TO SYNCHRONOUS SERVO DEMODULATION

CROSS-REFERENCE TO RELATED APPLICATIONS

This application claims the benefit of the filing date of U.S. provisional application No. 60/636,927, filed on Dec. 17, 2004, the teachings of which are incorporated herein by reference.

The subject matter of this application is related to U.S. patent application Ser. No. 10/228,548, filed on Aug. 27, 2002, the teachings of which are incorporated herein by reference.

BACKGROUND OF THE INVENTION

1. Field of the Invention

The present invention relates to data transfer through a communication system channel, and, more particularly, to detection of data information from a recording medium.

2. Description of the Related Art

A read channel component is an integrated circuit (IC) of a computer hard disk (HD) drive that encodes, detects, and decodes data, enabling a read/write head to correctly i) write data to the disk drive and ii) read back the data. The disks in an HD drive have a number of tracks, each track consisting of i) user (or "read") data sectors and ii) control (or "servo") data sectors embedded between the read sectors. Information stored in the servo sectors is employed to position the head (e.g., a magnetic recording/playback head) over a track so that the information stored in the read sectors can be retrieved properly.

Referring to FIG. 1, a servo sector 100 typically comprises a servo preamble 101, followed by an encoded servo address mark (SAM) 102, followed by encoded Gray data 103, followed by a burst demodulation (demod) field 104, followed by a repeatable run-out (RRO) field 105. The servo preamble enables timing recovery and gain adjustment of the written servo data. The SAM is an identifier of fixed bit-length that identifies the beginning of the servo data, with the value for this identifier being the same for all servo sectors. For some prior-art systems, a 9-bit SAM is written (after encoding) between the servo preamble field and the servo Gray data.

Gray data represents the track number/cylinder information and provides coarse positioning information for the head. The burst demod field provides fine positioning information for the head. RRO field data provides head positioning information that is i) finer than that provided by Gray data and ii) coarser than that provided by the burst demodulation fields. Specifically, RRO field data is typically employed for compensation when the head does not follow a circular track around the disk.

A read sector comprises a read preamble, a read address mark (RAM), and encoded user data. The read preamble also provides for timing recovery and gain adjustment, and the RAM identifies the read sector user data.

Servo information is encoded by one or more encoders, each encoder converting M input bits (an input data block) into N output symbols (an output codeword). The encoded servo information is written to the disk and read back by a magnetic recording head. When the head of a recording system reads data from a sector of a hard disk, the data is provided as an analog signal (readback signal) that is subsequently level-adjusted, equalized, and sampled for further digital signal processing to detect and decode the servo information.

The readback data is equalized to a desired target partial response by an equalizer configured as a continuous time filter (CTF) followed by a discrete-time finite impulse response (FIR) filter. In a synchronous system, the sampling of the CTF output signal uses timing information generated by a digital phase-locked loop (DPLL) locked to the symbol rate (T). The output samples of the equalizer are quantized to digital sample values ('Y' values) using an A/D converter (ADC). The 'Y' values are applied to a data detector (e.g., threshold detector or Viterbi detector). A SAM detector then searches for the SAM bit pattern in the detected data. Once SAM is detected, the Gray code decoder decodes the data following the SAM data as Gray data. The burst demodulation is timed with respect to the detected SAM data based on known lengths of the SAM and Gray data. The detected SAM data thus serves as a reference for timing of the burst demodulation operation. Those lengths are, in some prior-art systems, a multiple of 4T.

A prior-art SAM detector for detecting an L-bit SAM operates is illustrated in FIG. 2. Every 4T (at the codeword boundary), the detected bit⁻(1 or 0) is shifted into L-bit shift register 201 (which is initialized to L 1s before detection begins). Detected bits are denoted by d(.) in FIG. 1. The L bits in shift register 201 are then compared by L-bit comparator 203 with a copy of the L-bit pattern [s(1) s(2) . . . s(L)] used for the SAM, which is stored in register 202. If the bit patterns of shift register 201 and register 202 match, then SAM detection is declared. Otherwise, the detection and shifting process continues until the SAM is found.

As noted above, in a synchronous system, the SAM is detected using samples retimed with a recovered clock driven by a digital phase-locked loop. However, radial phase incoherence has been found to render SAM detection difficult in a synchronous system.

SUMMARY OF THE INVENTION

In one embodiment, the present invention is a method and apparatus for synchronizing synchronous processing using data detected asynchronously. A first set of data is detected in a signal comprising synchronous samples and interpolated samples, wherein the first set of data is detected asynchronously as corresponding to one of the samples. A time to transmit a data-found signal is determined based on an offset between the data-detected sample and one of the synchronous samples. The data-found signal is transmitted at the determined time to enable the synchronous processing of the synchronous samples.

In another embodiment, the present invention is a read channel component comprising an analog-to-digital (A/D) converter, one or more interpolators, an asynchronous data detector, and a synchronous processor. The A/D converter generates synchronous samples based on a signal received from a data channel. The one or more interpolators generate interpolated samples based on the synchronous samples. The asynchronous data detector receives the synchronous samples and the interpolated samples, detects a first set of data asynchronously as corresponding to one of the samples, determines a time to transmit a data-found signal based on an offset between the data-detected sample and one of the synchronous samples, and transmits the data-found signal at the determined time. The synchronous processor performs synchronous processing of the synchronous samples based on receipt of the data-found signal.

In one implementation, the synchronous samples correspond to a readback signal read from a data recording channel, the first set of data corresponds to servo address mark (SAM) data in a servo sector in the readback signal, and the synchronous processing is demodulation of burst data in the servo sector.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

DETAILED DESCRIPTION

Figure 1:
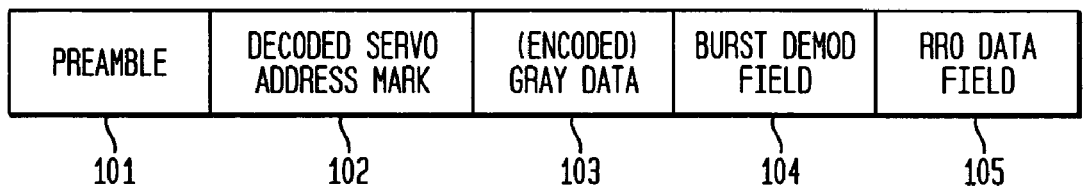
FIG. 1 illustrates a prior-art servo sector.
Figure 2:
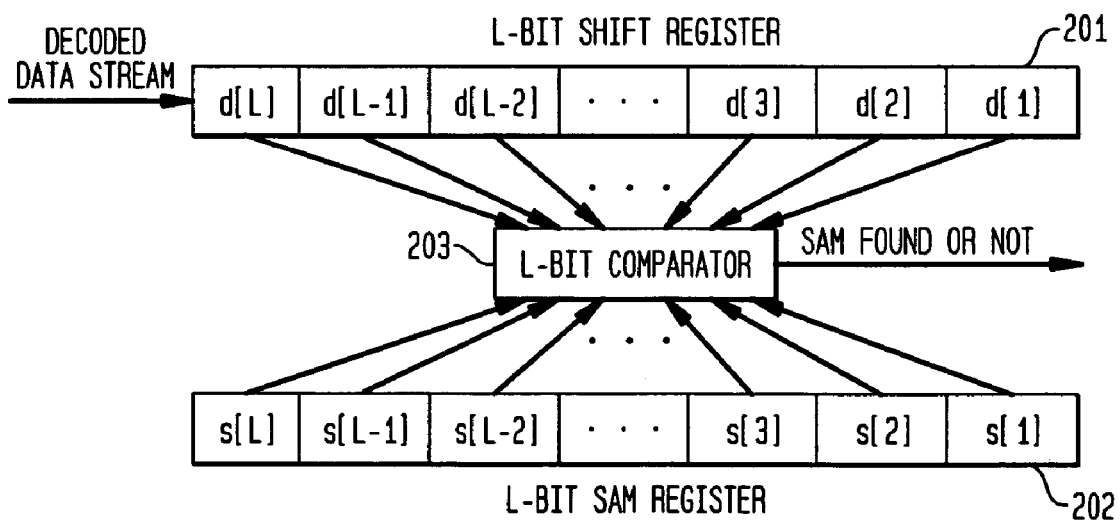
FIG. 2 illustrates a prior-art servo address mark detection method.

In an effort to overcome the problem of radial phase incoherence, an asynchronous detection algorithm is used to detect the SAM data. In one exemplary embodiment, an asynchronous detection algorithm employs a bank of seven interpolators along with a synchronously sampled analog/digital converter (ADC) output to perform asynchronous detection of the SAM data. The interpolators provide a series of outputs that are successively ⅛ clock cycle digitally phase-shifted from the ADC output. The SAM data may be identified on any of these outputs. While the SAM data detection is not synchronous, the burst demodulation operation remains synchronous.

Since servo Gray data can be successfully recovered only after the SAM is detected, accurate detection of the SAM is relatively important. Consequently, reducing the SAM miss rate (i.e., the rate of failed SAM detection) and the false SAM rate (i.e., the rate of incorrect SAM detection) is desirable. Although low SAM miss rate and false SAM rate are important, better performance results for higher SAM miss rate than for higher false SAM rate.

As a higher number of bits are examined for SAM detection, the false SAM rate decreases, but the SAM miss rate increases. Similarly, as a lower number of bits are examined, the false rate increases, but the SAM miss rate decreases. Consequently, for a certain number of bits (L) for SAM detection, a given design attempts to improve the false SAM rate without an increase in format overhead (i.e., without increasing L).

For an L-bit-wide SAM encoded with an exemplary wide biphase code, [s(1) s(2) s(3) . . . s(L)] denotes the L-bit pattern used for the SAM, where each s(.) is either a "0" or a "1". A wide biphase code encodes, for example, a "0" to "1100" and a "1" to "0011". Typically, a threshold detector is employed to detect wide biphase-encoded information. The readback signal exhibits either a positive peak or a negative peak at the codeword boundary (every 4T, for the above exemplary encoding) after equalization to a target partial response. Thus, by having a threshold of zero at the codeword boundary, if the received sample is greater than the threshold, then the data bit is detected and decoded as a "1"; otherwise, the data bit is detected and decoded as a "0".

In accordance with an exemplary method of the invention, processing of a readback signal is accomplished using a synchronous-sampling analog-to-digital converter (ADC) and a plurality of interpolators. Each interpolator provides an output signal that is phase-shifted from the output of the ADC. In an exemplary embodiment, seven interpolators may be provided. As a result, eight output signals are provided in this exemplary embodiment. In other embodiments, other numbers of interpolators may be used.

The phase-shifting may be equal, so that the output signals include one synchronized signal and seven signals successively ⅛ of a clock cycle from another. The readback signal includes a servo sector with field data. In particular, the field data may include a preamble, an encoded servo address mark (SAM), encoded Gray data, a burst demodulation (demod) field, and a repeatable run-out (RRO) field. The detected SAM data serves as a reference for timing of the burst demodulation operation. Since the detected SAM data may be on any of the output signals, the burst demodulation operation will not be synchronized properly if the detected SAM data is, in general, neither on the synchronized output nor on an output that is close in phase to the synchronized output.

Figure 3:
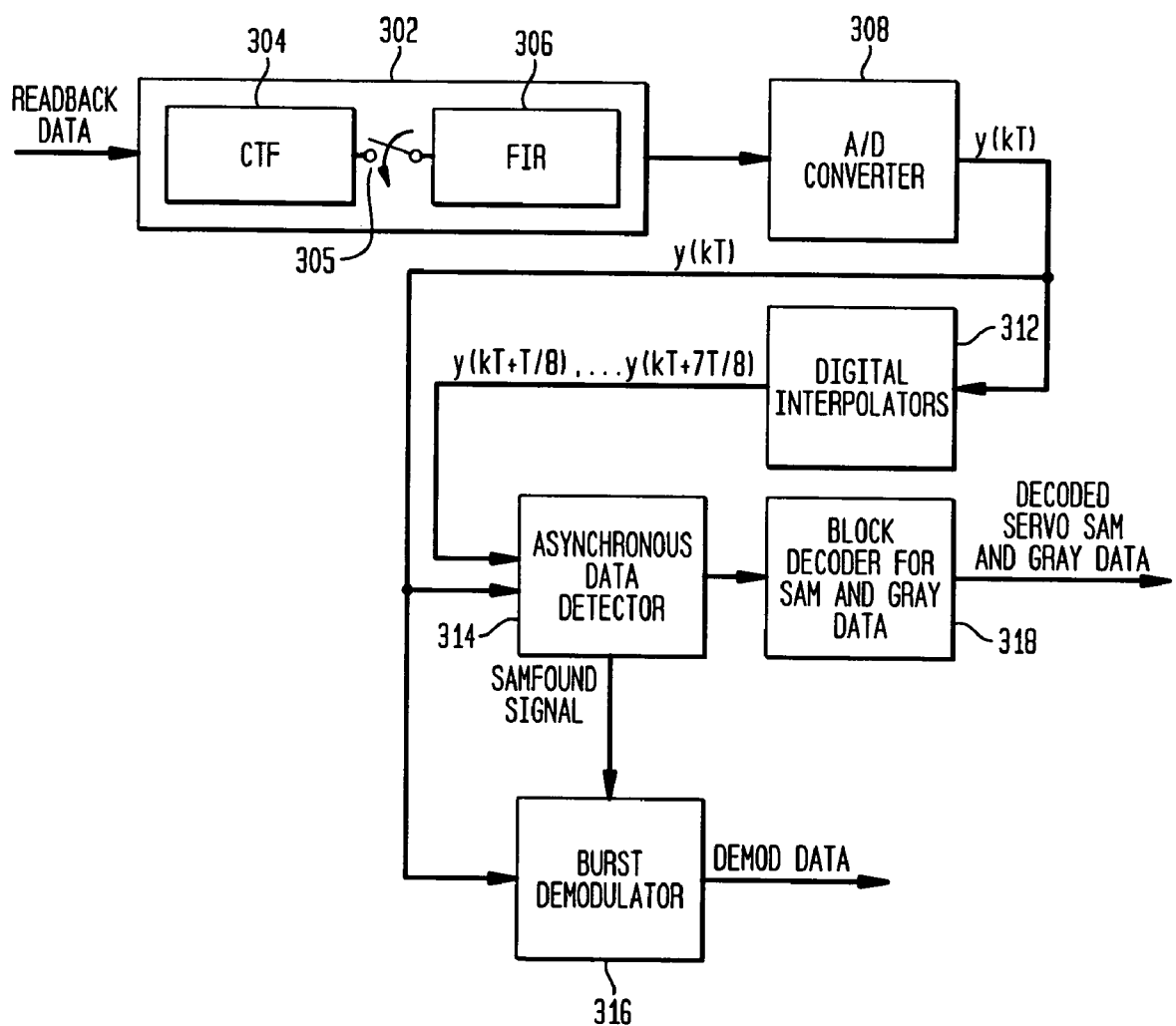
FIG. 3 illustrates an exemplary readback channel in which the invention may be implemented.

An exemplary readback channel in which the invention may be implemented will now be explained with reference to FIG. 3. Readback data is received, such as from a magnetic medium via magnetic read head (not shown) and then equalized by equalizer 302. Equalizer 302 may include continuous time filter (CTF) 304 followed, via switch 305, by discrete-time, finite impulse response (FIR) filter 306. A servo waveform corresponding to an encoded servo pattern is equalized by equalizer 302.

The equalized waveform is then provided to A/D converter 308. The input to the A/D converter is a T-symbol-rate target-response-equalized analog signal. The digital values at the output of the A/D converter are referred to as the y(kT) values, where k is an integer.

The synchronous, symbol-rate samples from the A/D converter are then interpolated using digital interpolators 312. Seven digital interpolators may be used, although more or fewer may also be used. The outputs of digital interpolators 312 are interpolated y values from y(kT+T/8) to y(kT+7T/8). The y(kT) samples from the A/D converter and the interpolated y values from the digital interpolators are provided to asynchronous data detector 314, where the values are processed in an asynchronous manner. Note that, since interpolation typically involves the generation of estimated y values falling between two consecutive synchronous y samples, the interpolated values y(kT+T/8) to y(kT+7T/8) are generated after time (k+1)T using (at least) synchronous samples y(kT) and y((k+1)T).

The output of A/D converter 308 is also provided to burst demodulator 316. The operation of burst demodulator 316 is timed to a signal provided by asynchronous data detector 314 indicating that the SAM data has been found, which signal is referred to as a SAMFOUND signal. When SAM data is detected by asynchronous data detector 314, a SAMFOUND signal is provided to burst demodulator 316. Burst demodulator 316 includes a counter that waits a certain time (e.g., based on the amount of data between the end of SAM field 102 and the beginning of burst demod field 104 in FIG. 1 taking into account the known processing speed of asynchronous data detector 314) from receipt of the SAMFOUND signal before starting burst demodulation. The output of burst demodulator 316 is demodulated data.

The output of asynchronous data detector 314 is also provided to block decoder 318 for decoding SAM and Gray data. The output of block decoder 318 is decoded servo SAM and Gray data.

Figure 4:
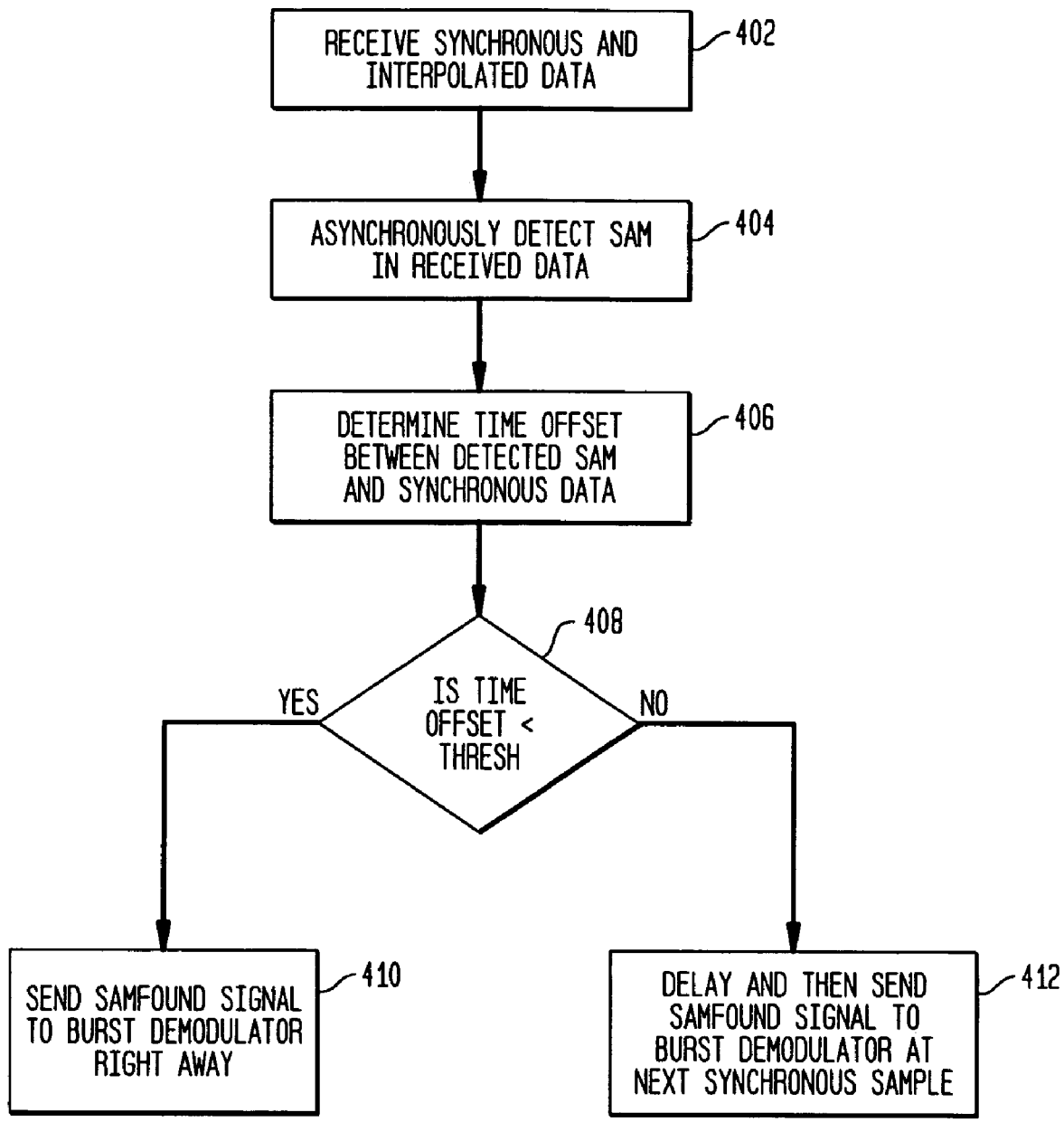
FIG. 4 shows a process flow in an implementation of the invention.

Referring to FIG. 4, an exemplary process flow is illustrated. The process flow may be carried out by asynchronous data detector 314. At step 402, the synchronous outputs from ADC 308 and the interpolated outputs from interpolators 312 are received. At step 404, a SAM field is asynchronously detected in the received data, e.g., using the techniques described in the Annarnpedu 3-8 application. In general, the SAM field may be detected as coinciding with any of the synchronous or interpolated samples. At step 406, the time offset between the sample at which the SAM field was detected and the previous synchronous sample is determined. In the exemplary technique in which seven evenly spaced, interpolated samples are generated between each pair of consecutive synchronous samples, the time offset can range from 0 to $7T/8$ in $T/8$ increments.

At step 408, the time offset is compared to a specified threshold. If the time offset is less than the specified threshold, then, at step 410, the SAMFOUND signal is transmitted to burst demodulator 316 right away. Otherwise, the time offset is not less than the specified threshold and, at step 412, the SAMFOUND signal is delayed and then transmitted to burst demodulator 316 to coincide with the next synchronous sample.

In one possible implementation, the specified threshold is set equal to $2T/8$. In this case, if the SAM is detected to coincide with synchronous sample $y(kT)$ or the first interpolated sample $y(kT+T/8)$, then the SAMFOUND signal will be sent to burst demodulator 316 right away. Otherwise, the SAMFOUND signal is delayed and then transmitted to coincide with the next synchronous sample. Other threshold values are possible.

In an alternative embodiment, the algorithm considers interpolated samples prior to synchronous sample $y(kT)$ as well as those after. In that case, the time offset calculated in step 406 may be considered to be the absolute value of the difference between synchronous sample $y(kT)$ and the sample at which the SAM is detected. Assuming the previous example of a threshold of $2T/8$, if the SAM is detected to coincide with interpolated sample $y((k-1)T+7T/8)$, synchronous sample $y(kT)$, or interpolated sample $y(kT+T/8)$, then the SAMFOUND signal will be sent to burst demodulator 316 right away. Otherwise, the SAMFOUND signal is delayed and then transmitted to coincide with the next synchronous sample.

One way to implement this processing for a threshold of $2T/8$ is to examine the triple of samples corresponding to the sample at which the SAM is detected, where the SAM-detected sample is at the middle of the triple, the sample $T/8$ prior to the SAM-detected sample is at the beginning of the triple, and the sample $T/8$ after the SAM-detected sample is at the end of the triple. In this implementation, if any one of the three samples in the triple is synchronous sample $y(kT)$, then the SAMFOUND signal is transmitted right away. Otherwise, the SAMFOUND signal is delayed to coincide with the next synchronous sample. Note that, if the threshold were extended to $3T/8$, then processing could be implemented in an analogous manner using five-tuples of samples centered on the SAM-detected sample. In general, a threshold of $nT/8$ can be implemented using a $(2n-1)$-tuple of samples.

The present invention may allow for one or more of the following advantages. A given implementation allows for synchronization of the demodulation function to asynchronously detected servo address mark data. As a result, the SAM detection function can be implemented in an asynchronous manner, reducing the problems caused by radial phase incoherence.

Although the present invention has been described in the context of an implementation that generates seven interpolated data values for each synchronous data value, the present invention can also be implemented using other numbers of interpolated data values.

While the exemplary embodiments of the present invention have been described with respect to processes of circuits, the present invention is not so limited. As would be apparent to one skilled in the art, various functions of circuit elements may also be implemented in the digital domain as processing steps in a software program. Such software may be employed in, for example, a digital signal processor, micro-controller or general-purpose computer.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It will be further understood that various changes in the details, materials, and arrangements of the parts which have been described and illustrated in order to explain the nature of this invention may be made by those skilled in the art without departing from the principle and scope of the invention as expressed in the following claims.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

We claim:

1. A method for synchronizing synchronous processing using data detected asynchronously, comprising:
   (a) detecting a first set of data in a signal comprising synchronous samples and interpolated samples, wherein the first set of data is detected asynchronously as corresponding to one of the samples;
   (b) determining a time to transmit a data-found signal based on an offset between the data-detected sample and one of the synchronous samples; and
   (c) transmitting the data-found signal at the determined time to enable the synchronous processing of the synchronous samples.

2. The invention of claim 1, wherein:
   the synchronous samples correspond to a readback signal read from a data recording channel;
   the first set of data corresponds to servo address mark (SAM) data in a servo sector in the readback signal; and the synchronous processing is demodulation of burst data in the servo sector.

3. The invention of claim 2, wherein:
the SAM data precedes the burst data in the servo sector by a known amount of data; and
the demodulation of the burst data is initiated a specified duration following receipt of the data-found signal, wherein the specified duration is based on the known amount of data between the SAM data and the burst data.

4. The invention of claim 1, wherein the timing of the transmission of the data-found signal is based on whether the offset is greater than or less than a specified threshold.

5. The invention of claim 4, wherein:
the data-found signal is transmitted right away if the offset is less than the specified threshold; and
the data-found signal is transmitted after a delay if the offset is greater than the specified threshold.

6. The invention of claim 5, wherein the delayed transmission of the data-found signal corresponds to a subsequent synchronous sample.

7. The invention of claim 1, wherein step (b) comprises:
(1) determining whether an n-tuple of samples corresponding to the data-detected sample includes a synchronous sample; and
(2) determining the time to transmit the data-found signal based on step (b)(1).

8. The invention of claim 7, wherein:
the data-found signal is transmitted right away if the n-tuple include a synchronous sample; and
the data-found signal is transmitted after a delay if the n-tuple does not include a synchronous sample.

9. The invention of claim 8, wherein the delayed transmission of the data-found signal corresponds to a subsequent synchronous sample.

10. Apparatus for synchronizing synchronous processing using data detected asynchronously, comprising:
(a) means for detecting a first set of data in a signal comprising synchronous samples and interpolated samples, wherein the first set of data is detected asynchronously as corresponding to one of the samples;
(b) means for determining a time to transmit a data-found signal based on an offset between the data-detected sample and one of the synchronous samples; and
(c) means for transmitting the data-found signal at the determined time to enable the synchronous processing of the synchronous samples.

11. The invention of claim 10, wherein:
the synchronous samples correspond to a readback signal read from a recording data channel;
the first set of data corresponds to SAM data in a servo sector in the readback signal;
the synchronous processing is demodulation of burst data in the servo sector;
the SAM data precedes the burst data in the servo sector by a known amount of data; and
the demodulation of the burst data is initiated a specified duration following receipt of the data-found signal, wherein the specified duration is based on the known amount of data between the SAM data and the burst data.

12. A read channel component comprising:
an analog-to-digital (A/D) converter adapted to generate synchronous samples based on a signal received from a data channel;
one or more interpolators adapted to generate interpolated samples based on the synchronous samples;
an asynchronous data detector adapted to:
receive the synchronous samples and the interpolated samples;
detect a first set of data as corresponding to one of the samples;
determine a time to transmit a data-found signal based on an offset between the data-detected sample and one of the synchronous samples; and
transmit the data-found signal at the determined time; and
a synchronous processor adapted to perform synchronous processing of the synchronous samples based on receipt of the data-found signal.

13. The invention of claim 12, wherein:
the received signal is a readback signal read from a data recording channel;
the first set of data corresponds to SAM data in a servo sector in the readback signal; and
the synchronous processor is a burst demodulator adapted to demodulate burst data in the servo sector.

14. The invention of claim 13, wherein:
the SAM data precedes the burst data in the servo sector by a known amount of data; and
the burst demodulator is adapted to initiate demodulation of the burst data a specified duration following receipt of the data-found signal, wherein the specified duration is based on the known amount of data between the SAM data and the burst data.

15. The invention of claim 12, wherein the timing of the transmission of the data-found signal is based on whether the offset is greater than or less than a specified threshold.

16. The invention of claim 15, wherein:
the asynchronous data detector is adapted to transmit the data-found signal right away if the offset is less than the specified threshold; and
the asynchronous data detector is adapted to transmit the data-found signal after a delay if the offset is greater than the specified threshold.

17. The invention of claim 16, wherein the delayed transmission of the data-found signal corresponds to a subsequent synchronous sample.

18. The invention of claim 12, wherein the asynchronous data detector is adapted to:
(1) determine whether an n-tuple of samples corresponding to the data-detected sample includes a synchronous sample; and
(2) determine the time to transmit the data-found signal based on the determination of (1).

19. The invention of claim 18, wherein:
the asynchronous data detector is adapted to transmit the data-found signal right away if the n-tuple includes a synchronous sample; and
the asynchronous data detector is adapted to transmit the data-found signal after a delay if the n-tuple does not include a synchronous sample.

20. The invention of claim 19, wherein the delayed transmission of the data-found signal corresponds to a subsequent synchronous sample.

* * * * *